United States Patent
Buitenhuis

(10) Patent No.: US 12,346,291 B2
(45) Date of Patent: Jul. 1, 2025

(54) ON-THE-FLY/TRANSPARENT FRAGMENTED ISOBMFF TO PROGRESSIVE ISOBMFF TRANSMULTIPLEXING PROXY

(71) Applicant: Vimeo.com, Inc., New York, NY (US)

(72) Inventor: Derek Buitenhuis, Exeter (GB)

(73) Assignee: VIMEO.COM, INC., New York, NY (US)

( * ) Notice: Subject to any disclaimer, the term of this patent is extended or adjusted under 35 U.S.C. 154(b) by 309 days.

(21) Appl. No.: 17/979,873

(22) Filed: Nov. 3, 2022

(65) Prior Publication Data

US 2023/0135804 A1     May 4, 2023

Related U.S. Application Data

(60) Provisional application No. 63/275,147, filed on Nov. 3, 2021.

(51) Int. Cl.
    *G06F 16/17*      (2019.01)
(52) U.S. Cl.
    CPC ................ *G06F 16/1724* (2019.01)
(58) Field of Classification Search
    CPC .................................. G06F 16/1724
    See application file for complete search history.

(56) References Cited

U.S. PATENT DOCUMENTS

| | | | | |
|---|---|---|---|---|
| 7,689,591 B2* | 3/2010 | Fukushima | ............ | G11B 27/02 707/999.107 |
| 8,677,504 B2* | 3/2014 | Wingert | ........... | H04N 21/85406 380/201 |
| 8,719,437 B1* | 5/2014 | Bazzarella, Jr. | ........................... | H04N 21/440218 709/219 |
| 9,001,634 B2* | 4/2015 | Lee | .......... | G06F 16/00 369/53.37 |
| 9,237,178 B2* | 1/2016 | Li | ............ | H04L 65/70 |
| 9,936,229 B1* | 4/2018 | Wagenaar | ........ | H04N 21/23106 |
| 10,425,666 B2* | 9/2019 | Ha | ...... | H04N 21/8455 |
| 10,747,722 B2* | 8/2020 | Rogers | ............... | G11B 27/3027 |
| 10,979,784 B1* | 4/2021 | Mekuria | ................ | H04L 65/762 |
| 11,418,561 B2* | 8/2022 | Sodagar | ................... | H04L 65/65 |
| 11,695,815 B1* | 7/2023 | Mekuria | ................. | H04L 65/70 709/231 |
| 11,750,865 B1* | 9/2023 | Mekuria | ............... | H04L 65/612 725/116 |
| 11,856,181 B2* | 12/2023 | Lee | ....................... | H04N 13/243 |
| 12,131,754 B2* | 10/2024 | Kondrad | ............ | H04N 21/2353 |

(Continued)

*Primary Examiner* — Charles L Beard
(74) *Attorney, Agent, or Firm* — BakerHostetler

(57) ABSTRACT

An aspect of the subject technology includes a method including receiving a request including an input file and a selection. The input file is in the fragmented ISOBMFF format. The method also includes parsing one or more fragments from the input file, generating a cache object based on the fragments, generating an output moov box based on at least one of the fragments or the cache object, calculating output mdat offsets for the selection corresponding to the fragments based on at least one of the fragments or the cache object, and determining output bytes of an output mdat section. The output mdat section is based on the output mdat offsets. The method further includes multiplexing the output bytes to the progressive ISOBMFF format, and serving the multiplexed output bytes.

24 Claims, 6 Drawing Sheets

(56) References Cited

U.S. PATENT DOCUMENTS

| | | | | |
|---|---|---|---|---|
| 2003/0103073 A1* | 6/2003 | Yokoyama | H04N 21/435 | 348/E5.007 |
| 2005/0010956 A1* | 1/2005 | Moon | H04N 5/783 | 725/135 |
| 2005/0169303 A1* | 8/2005 | Toma | H04N 21/2404 | 375/E7.267 |
| 2005/0238057 A1* | 10/2005 | Toma | H04N 21/85406 | 370/535 |
| 2005/0254498 A1* | 11/2005 | Itoh | H04N 9/8042 | 370/394 |
| 2006/0051057 A1* | 3/2006 | Nakagawa | H04N 9/8205 | 386/318 |
| 2006/0092938 A1* | 5/2006 | Gentrix | H04N 21/235 | 375/E7.024 |
| 2006/0139379 A1* | 6/2006 | Toma | G06T 3/40 | 345/698 |
| 2006/0165381 A1* | 7/2006 | Eckleder | G11B 27/105 | |
| 2006/0200509 A1* | 9/2006 | Cho | G06F 16/50 | |
| 2006/0245729 A1* | 11/2006 | Itoh | G11B 27/034 | 386/241 |
| 2006/0291798 A1* | 12/2006 | Suneya | H04N 9/8042 | |
| 2007/0028235 A1* | 2/2007 | Liu | H04N 21/2541 | 348/E7.063 |
| 2007/0053658 A1* | 3/2007 | Murakami | G11B 27/11 | 386/283 |
| 2007/0058951 A1* | 3/2007 | Kashiwagi | G11B 27/3027 | |
| 2007/0130498 A1* | 6/2007 | Hannuksela | G11B 27/005 | 348/E5.007 |
| 2007/0201832 A1* | 8/2007 | Date | G11B 27/105 | 386/326 |
| 2007/0244929 A1* | 10/2007 | Huang | G06Q 30/0277 | 707/999.102 |
| 2007/0261092 A1* | 11/2007 | Ozawa | H04N 21/6437 | 348/E7.071 |
| 2007/0291841 A1* | 12/2007 | Muraki | H04N 19/46 | 375/E7.211 |
| 2008/0040215 A1* | 2/2008 | Huang | G06Q 30/02 | 707/999.107 |
| 2008/0252719 A1* | 10/2008 | Choi | H04N 13/207 | 348/E13.001 |
| 2008/0256431 A1* | 10/2008 | Hornberger | G06F 16/4387 | 715/201 |
| 2009/0024644 A1* | 1/2009 | Cho | H04N 21/8455 | 707/999.102 |
| 2009/0055417 A1* | 2/2009 | Hannuksela | G06F 16/48 | |
| 2009/0066783 A1* | 3/2009 | Lee | H04N 13/189 | 348/E13.001 |
| 2009/0119594 A1* | 5/2009 | Hannuksela | H04N 21/41407 | 715/723 |
| 2009/0122134 A1* | 5/2009 | Joung | H04N 9/8205 | 348/E13.001 |
| 2009/0148070 A1* | 6/2009 | Hwang | H04N 13/189 | 382/305 |
| 2009/0185619 A1* | 7/2009 | Taleb | H04N 21/2335 | 375/E7.011 |
| 2009/0195640 A1* | 8/2009 | Kim | H04N 19/597 | 348/E13.001 |
| 2009/0199100 A1* | 8/2009 | Hwang | G11B 27/32 | 715/723 |
| 2009/0208119 A1* | 8/2009 | Lee | G11B 27/034 | 382/232 |
| 2009/0228283 A1* | 9/2009 | Toma | G10L 21/038 | 704/E21.001 |
| 2009/0259686 A1* | 10/2009 | Figueroa | G06F 16/487 | |
| 2009/0284583 A1* | 11/2009 | Hwang | H04N 13/178 | 348/E13.001 |
| 2009/0295907 A1* | 12/2009 | Kim | H04N 19/597 | 348/E13.001 |
| 2010/0005120 A1* | 1/2010 | Kim | G11B 27/034 | 707/E17.009 |
| 2010/0073492 A1* | 3/2010 | Kudo | H04N 25/69 | 348/208.1 |
| 2010/0146018 A1* | 6/2010 | Kim | H04N 21/235 | 707/822 |
| 2010/0161686 A1* | 6/2010 | Yun | H04N 13/161 | 707/812 |
| 2010/0171812 A1* | 7/2010 | Kim | H04N 13/178 | 348/43 |
| 2010/0191778 A1* | 7/2010 | Kim | G11B 27/034 | 707/821 |
| 2011/0096828 A1* | 4/2011 | Chen | H04N 21/440227 | 375/E7.126 |
| 2011/0119394 A1* | 5/2011 | Wang | H04L 65/65 | 709/231 |
| 2011/0219098 A1* | 9/2011 | Xu | H04L 67/06 | 709/219 |
| 2011/0231519 A1* | 9/2011 | Luby | H04N 21/440227 | 709/219 |
| 2011/0231569 A1* | 9/2011 | Luby | H04N 21/44209 | 709/234 |
| 2011/0238789 A1* | 9/2011 | Luby | H04L 65/612 | 709/219 |
| 2011/0239078 A1* | 9/2011 | Luby | H04N 21/23106 | 714/752 |
| 2011/0246659 A1* | 10/2011 | Bouazizi | H04L 67/06 | 709/231 |
| 2012/0011270 A1* | 1/2012 | Priddle | H04N 21/8456 | 709/231 |
| 2012/0013746 A1* | 1/2012 | Chen | H04N 21/85406 | 348/180 |
| 2012/0016965 A1* | 1/2012 | Chen | H04N 21/23439 | 709/219 |
| 2012/0020413 A1* | 1/2012 | Chen | H04N 19/61 | 375/240.26 |
| 2012/0101608 A1* | 4/2012 | Jang | G11B 27/3027 | 700/94 |
| 2012/0233345 A1* | 9/2012 | Hannuksela | H04N 21/8456 | 709/231 |
| 2012/0259946 A1* | 10/2012 | Stockhammer | H04N 21/8456 | 709/217 |
| 2012/0259994 A1* | 10/2012 | Gillies | H04L 12/189 | 709/231 |
| 2012/0269256 A1* | 10/2012 | Ki | H04N 21/85406 | 375/E7.026 |
| 2012/0278495 A1* | 11/2012 | Furbeck | H04L 67/02 | 709/231 |
| 2012/0278610 A1* | 11/2012 | Waller | H04N 21/4623 | 713/150 |
| 2013/0007223 A1* | 1/2013 | Luby | H04N 21/234327 | 709/219 |
| 2013/0028062 A1* | 1/2013 | Liu | G11B 27/329 | |
| 2013/0042100 A1* | 2/2013 | Bouazizi | H04N 21/8456 | 713/151 |
| 2013/0060911 A1* | 3/2013 | Nagaraj | H04L 65/612 | 709/219 |
| 2013/0110977 A1* | 5/2013 | Hong | H04H 20/82 | 709/218 |
| 2013/0114597 A1* | 5/2013 | Ogisawa | H04L 65/611 | 370/390 |
| 2013/0124699 A1* | 5/2013 | Jung | H04L 65/756 | 709/219 |
| 2013/0125187 A1* | 5/2013 | Kim | H04N 21/4385 | 725/109 |
| 2013/0167184 A1* | 6/2013 | Hong | H04N 21/23614 | 725/109 |
| 2013/0170561 A1* | 7/2013 | Hannuksela | H04N 19/188 | 375/240.25 |
| 2013/0238758 A1* | 9/2013 | Lee | H04N 21/242 | 709/218 |
| 2013/0246643 A1* | 9/2013 | Luby | H04L 65/762 | 709/231 |
| 2014/0115647 A1* | 4/2014 | Kim | H04N 21/2662 | 725/110 |
| 2014/0147100 A1* | 5/2014 | Bakharov | G11B 27/3027 | 386/285 |
| 2015/0193494 A1* | 7/2015 | Malamal Vadakital | H04N 21/85406 | 707/697 |

(56) References Cited

U.S. PATENT DOCUMENTS

| | | | |
|---|---|---|---|
| 2015/0215359 A1* | 7/2015 | Bao | H04L 65/80 |
| | | | 709/219 |
| 2015/0334413 A1* | 11/2015 | Gorin | H04N 19/85 |
| | | | 375/240.26 |
| 2015/0382034 A1* | 12/2015 | Thangaraj | H04N 19/40 |
| | | | 709/231 |
| 2016/0036885 A1* | 2/2016 | Takashima | G09C 5/00 |
| | | | 709/246 |
| 2016/0261665 A1* | 9/2016 | Stockhammer | H04L 65/65 |
| 2016/0261893 A1* | 9/2016 | Oh | H04N 21/235 |
| 2017/0063960 A1* | 3/2017 | Stockhammer | H04N 21/4621 |
| 2017/0111649 A1* | 4/2017 | Wang | H04N 19/188 |
| 2017/0148483 A1* | 5/2017 | Takahashi | G11B 20/10 |
| 2018/0077210 A1* | 3/2018 | Hannuksela | H04N 21/8456 |
| 2018/0098242 A1* | 4/2018 | Thienot | H04L 65/70 |
| 2018/0103271 A1* | 4/2018 | Wang | H04L 65/65 |
| 2018/0199075 A1* | 7/2018 | Wang | H04L 65/65 |
| 2018/0277164 A1* | 9/2018 | Wang | H04N 21/2353 |
| 2018/0295407 A1* | 10/2018 | Michael | H04H 60/82 |
| 2018/0316740 A1* | 11/2018 | Stockhammer | H04L 65/40 |
| 2018/0359520 A1* | 12/2018 | Takahashi | H04N 21/4425 |
| 2019/0052937 A1* | 2/2019 | Malamal Vadakital | |
| | | | H04N 21/85406 |
| 2019/0243881 A1* | 8/2019 | Zia | H04N 21/435 |
| 2020/0021883 A1* | 1/2020 | Stockhammer | H04N 21/8456 |
| 2020/0077161 A1* | 3/2020 | Lohmar | H04L 65/762 |
| 2020/0092600 A1* | 3/2020 | Di | H04N 21/440245 |
| 2020/0221063 A1* | 7/2020 | Kammachi Sreedhar | |
| | | | H04N 21/85406 |
| 2020/0329284 A1* | 10/2020 | Denoual | H04L 69/321 |
| 2021/0281621 A1* | 9/2021 | Sodagar | H04L 67/02 |
| 2022/0150296 A1* | 5/2022 | Hannuksela | H04N 21/8456 |
| 2022/0167042 A1* | 5/2022 | Hannuksela | H04N 21/26258 |
| 2022/0239994 A1* | 7/2022 | Katsumata | H04N 21/8456 |
| 2022/0337922 A1* | 10/2022 | Denoual | H04N 19/176 |
| 2022/0407904 A1* | 12/2022 | Ilola | H04L 65/613 |
| 2023/0062691 A1* | 3/2023 | Sreedhar | H04N 21/8456 |
| 2023/0072093 A1* | 3/2023 | Hourunranta | H04N 21/21805 |
| 2023/0217065 A1* | 7/2023 | Drugeon | H04N 21/23439 |
| | | | 725/32 |
| 2023/0232082 A1* | 7/2023 | Aksu | H04N 21/854 |
| | | | 725/32 |
| 2023/0246808 A1* | 8/2023 | Léal | H04N 21/23476 |
| | | | 380/28 |
| 2023/0328261 A1* | 10/2023 | Hendry | H04N 21/2343 |
| | | | 375/240.24 |
| 2023/0336753 A1* | 10/2023 | Wang | H04N 19/197 |
| 2023/0336761 A1* | 10/2023 | Hendry | H04N 19/132 |
| 2023/0345053 A1* | 10/2023 | Wang | H04N 19/12 |
| 2023/0353842 A1* | 11/2023 | Maze | H04N 21/84 |
| 2023/0362456 A1* | 11/2023 | Hendry | H04N 21/236 |
| 2023/0388508 A1* | 11/2023 | Hendry | H04N 19/122 |
| 2024/0031622 A1* | 1/2024 | Hendry | H04N 19/105 |
| 2024/0040131 A1* | 2/2024 | Hannuksela | H04N 19/65 |
| 2024/0040169 A1* | 2/2024 | Hendry | H04N 21/2343 |
| 2024/0048768 A1* | 2/2024 | Hendry | H04N 19/172 |
| 2024/0064323 A1* | 2/2024 | Hendry | H04N 21/434 |
| 2024/0098130 A1* | 3/2024 | He | H04L 65/70 |
| 2024/0098307 A1* | 3/2024 | Ma | H04N 21/2404 |
| 2024/0163461 A1* | 5/2024 | Bouazizi | H04N 21/4331 |
| 2024/0205429 A1* | 6/2024 | Hendry | H04N 19/188 |
| 2024/0267421 A1* | 8/2024 | Ma | H04L 65/80 |
| 2024/0289590 A1* | 8/2024 | Cricrì | G06N 3/084 |
| 2024/0314408 A1* | 9/2024 | Maze | H04N 21/435 |
| 2024/0338343 A1* | 10/2024 | Kammachi Sreedhar | |
| | | | G06F 16/148 |
| 2024/0340431 A1* | 10/2024 | Cricrì | H04N 19/169 |
| 2024/0397127 A1* | 11/2024 | Denoual | H04N 21/26258 |
| 2025/0024119 A1* | 1/2025 | Maze | H04N 21/84 |

* cited by examiner

ON-THE-FLY/TRANSPARENT FRAGMENTED ISOBMFF TO PROGRESSIVE ISOBMFF TRANSMULTIPLEXING PROXY

CROSS-REFERENCE TO RELATED APPLICATIONS

This application claims priority to and the benefit of U.S. Provisional Application No. 63/275,147, entitled "IMPLEMENTING AN ON-THE-FLY/TRANSPARENT FRAGMENTED ISOBMFF TO PROGRESSIVE ISOBMFF TRANSMULTIPLEXING PROXY," filed Nov. 3, 2021, which is hereby incorporated by reference in its entirety.

TECHNICAL FIELD

The present description generally relates to video codecs and, more particularly, to systems, methods, and non-transitory computer-readable mediums for on-the-fly/transparent fragmented ISOBMFF to progressive ISOBMFF transmultiplexing proxy.

BACKGROUND

Historically, videos were served to users in an HTML5 <video> tag, as a progressive-style ISOBMFF file (e.g., MP4). The progressive type file contains a single header (e.g., a moov box), which contains all information about every ISOBMFF sample in the file, including what track the sample belongs to, exactly where the sample is within the file (e.g., an offset from the moov box), the timestamp of each sample (e.g., when it should be decoded and when it should be displayed), whether the file can seek to a particular sample and decode, a description of the codec used by the samples, and the like. Since creating the moov box requires information about the samples within the file, it cannot be created until the entire file has been parsed and multiplexed, usually resulting in it being written at the end of the file. To play the file while it is being downloaded, however, the moov header should be at the beginning of the file. Since files served in an HTML5 <video> tag were meant to be streamed over a network, multiplexers usually made a second pass over the multiplexed file to move the moov box to the front of the file and update all of the headers' offsets to reflect this move. This is slow, requires writing to disk, and is not conducive to on-the-fly multiplexing.

Many recent playlist formats and APIs (e.g., HLS, DASH, and the MediaSource JavaScript API) do not accept progressive ISOBMFF files. Instead, they expect fragments of fragmented ISOBMFF files. Progressive ISOBMFF files can contain everything about the whole file up-front in the moov box and can contain both audio and video. By contrast, fragmented ISOBMFF files contain only some track-level metadata like codec information, number of tracks, etc., in its moov box and can contain audio and/or video so that the API user can mix and match audio and video. The rest of the information, like timestamps, keyframe/seeking information, sample offsets, etc., is contained within each fragment (e.g., moof and mdat boxes), which can be as small as one sample, but are more commonly 2-6 seconds long. This way, a user can query for fragments to the API serving the file and switch between different resolutions, bitrates, etc., as it sees fit (Adaptive Bitrate Streaming).

There are two types of fragmented ISOBMFF files: "on-demand"-style and live-style files. "On-demand"-style files contain a sidx box directly after the moov header, which contains sizes in bytes for each fragment (not samples such as mdat boxes), thus allowing a demultiplexer to seek to a given fragment, read the sample information, and begin decoding. "Live-style" files have a sidx box prepended to each fragment, containing only that fragment's size, thus allowing an infinitely growing file, such as during a live stream. The former still requires multiplexing the whole file in order to obtain the sizes of each multiplexed fragment. Embodiments discussed herein are primarily concerned with (but not necessarily limited to) the "on-demand"-style of fragmented ISOBMFF (e.g., an "on-demand"-style fragmented ISOBMFF file is defined in ISO/IEC 23009-1 in "6.3.5 Self-Initializing Media Segment formats," and may use the "dash" brand to signify this).

BRIEF SUMMARY OF THE DISCLOSURE

An aspect of the subject technology includes a method including receiving a request including an input file and a selection. The input file is in the fragmented ISOBMFF format. The method also includes parsing one or more fragments from the input file, generating a cache object based on the fragments, generating an output moov box based on at least one of the fragments or the cache object, calculating output mdat offsets for the selection corresponding to the fragments based on at least one of the fragments or the cache object, and determining output bytes of an output mdat section. The output mdat section is based on the output mdat offsets. The method further includes multiplexing the output bytes to the progressive ISOBMFF format, and serving the multiplexed output bytes.

Another aspect of the subject technology includes a system including a controller configured to execute computer-readable instructions. The computer-readable instructions may cause the controller to perform operations including receiving a request including an input file and a selection. The input file is in the fragmented ISOBMFF format. The operations also include parsing one or more fragments from the input file, generating a cache object based on the fragments, generating an output moov box based on at least one of the fragments or the cache object, calculating output mdat offsets for the selection corresponding to the fragments based on at least one of the fragments or the cache object, and determining output bytes of an output mdat section. The output mdat section is based on the output mdat offsets. The operations further include multiplexing the output bytes to the progressive ISOBMFF format, and serving the multiplexed output bytes.

Yet another aspect of the subject technology includes a non-transitory computer-readable medium that stores instructions for converting a fragmented ISOBMFF format to a progressive ISOBMFF format. The instructions, when executed by a processor, cause the processor to perform operations including receiving a request including an input file and a selection. The input file is in the fragmented ISOBMFF format. The operations also include parsing one or more fragments from the input file, generating a cache object based on the fragments, generating an output moov box based on at least one of the fragments or the cache object, calculating output mdat offsets for the selection corresponding to the fragments based on at least one of the fragments or the cache object, and determining output bytes of an output mdat section. The output mdat section is based on the output mdat offsets. The operations further include multiplexing the output bytes to the progressive ISOBMFF format, and serving the multiplexed output bytes.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

ISO base media file format (ISOBMFF) is a container for files that contain multimedia data, such as audio and video. Popular file formats that utilize ISOBMFF include MP4. Where progressive ISOBMFF files contain everything about the file up-front in the moov box, fragmented ISOBMFF files contain only some track-level metadata like codec information, number of tracks, etc., in this up-front header. The rest of the information, like timestamps, keyframe/seeking information, sample offsets, etc. This way, a server of the file can server fragments at a time for playback, rather than waiting for the entire file, and switch between different resolutions, bitrates, etc. (Adaptive Bitrate Streaming). Systems typically repackage progressive ISOBMFF files as fragmented ISOBMFF files to serve to a user (e.g., an individual, a program, etc.) because many devices and software require progressive ISOBMFF files and large catalogs of progressive ISOBMFF files exist. However, storing two copies of each file (e.g., progressive and fragmented ISOBMFF) is expensive (e.g., in terms of computation, storage, etc.), and it is simpler to transmultiplex (also referred to as "transmux") from progressive ISOBMFF to fragmented ISOBMFF than the reverse, since all the sample data and metadata is available up-front at the start of the file.

Implementations of the concept of the present disclosure efficiently transmultiplexes from fragmented ISOBMFF to progressive ISOBMFF. Implementations include a service that proxies fragmented ISOBMFF files (e.g., a combination audio and video MP4, a video MP4 that does not have an audio track, etc.) such that they appear to users (e.g., individuals, programs, content delivery networks, etc.) as a progressive MP4 with the index at the front of the file. The service can remux the resulting progressive MP4 and generate a cache (or proxy) for subsequent, just-in-time multiplexing and serving.

Figure 1:
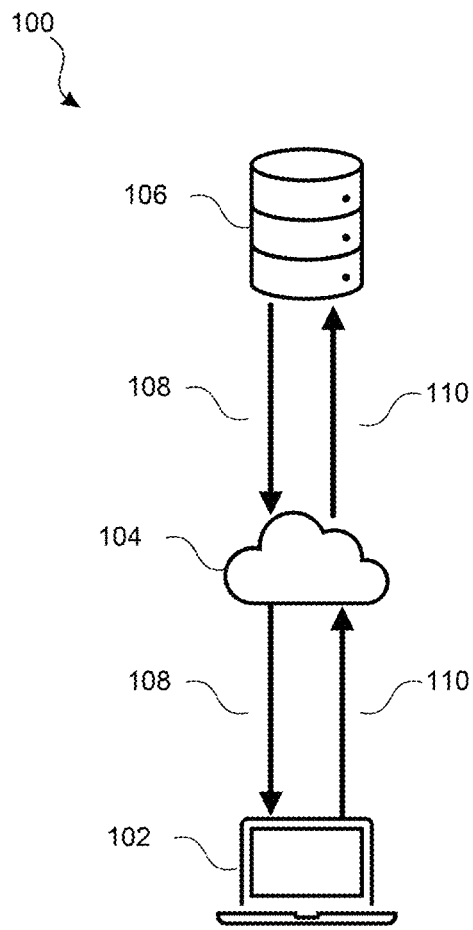
FIG. 1 illustrates an example network configuration for serving a progressive ISOBMFF file to a user, in accordance with one or more implementations.

FIG. 1 illustrates an example network configuration 100 for transmultiplexing a fragmented ISOBMFF file and serving a progressive ISOBMFF file to a user, in accordance with one or more implementations. The network configuration 100 may include a user computer 102 and a server 106 connected over a network 104. The user computer 102 may send one or more requests to the server 106 via the network 104 for a file, which may contain audio and/or video. The request may be for the whole file and/or part of the file. The server 106 may store the file in a fragmented ISOBMFF format, but the user computer 102 may want the requested file, or portions thereof, in a progressive ISOBMFF format.

To transmultiplex a fragmented ISOBMFF file into a progressive ISOBMFF file, the index of the file is moved to the front of the file. Since the server 106 wants the index at the front, all packet sizes, timestamps, metadata, and frame reordering must be known. Reading this information may happen during the first request from the user computer 102 and may be cached for subsequent similar requests. Therefore, an index with exact file offsets is derived just-in-time.

This index also needs to know precisely how packets are interleaved within the file, where interleaving may refer to the process of putting more than one data source (e.g., audio and video) through the same stream in an effort to speed up processing. That is, the server 106 may use the index to calculate the precise location of every packet in the output file before it is output.

For range requests, the index also needs to know where each packet in the output file comes from in the two input files, such as a mapping of an audio file and a video file. With this information in memory, e.g., from a cache, the server 106 can serve a range request by starting to request packets from the exact locations of the input files, skipping the appropriate number of bytes, starting to write/interleave bytes from that byte position (because the server 106 knows exactly where the output packet are), and stopping output at the end of the range request.

The server 106 may perform real-time (or faster) streaming (e.g., start writing bytes to the requester during multiplexing) and support arbitrary range requests into a progressive ISOBMFF output file without any additional disk or cloud storage usage.

In an exemplary embodiment, the server 106 may include a program that receives a video track fragmented file (e.g., MP4) with a sidx box that covers the video file's fragments ("vod-style") and optionally an audio track fragmented file (e.g., MP4) with a sidx box that covers the audio file's fragments ("vod-style"). The user computer 102 may send a request 110 (e.g., an HTTP request) to the server 106, which includes a valid range request for bytes 30000-400000, and receive a response 108 comprising a progressive ISOBMFF file that the user computer 102 can play as if it were a normal progressive ISOBMFF file.

Figure 2:
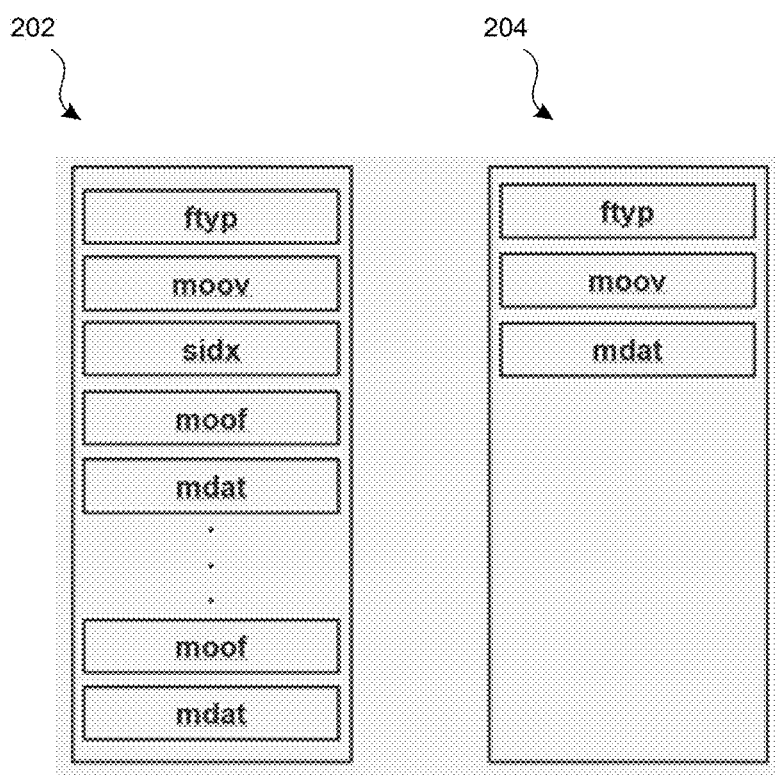
FIG. 2 illustrates a summary of file arrangements of fragmented and progressive ISOBMFF files, in accordance with one or more implementations.

FIG. 2 illustrates a summary of file arrangements of fragmented file 202 and progressive file 204, in accordance with one or more implementations. The fragmented file 202 and the progressive file 204 are ISOBMFF files. Both files may contain a file type box (ftyp), a movie box (moov), a segment index box (sidx), and a media data box (mdat). The ftyp box may specify the compatible specifications of the file. The moov box may define the timescale, duration, display characteristics, and other file characteristics. The fragmented file 202 contains a sidx box and a series of movie fragment boxes (moof) and mdat boxes. The sidx box stores metadata including the precise byte range locations of the moof and mdat segments. The progressive file 204, on the other hand, simply has a large mdat box. It should be understood that the ISOBMFF files are not limited to the boxes shown and may include more boxes or fewer boxes as well as sub-boxes within boxes.

Figure 3:
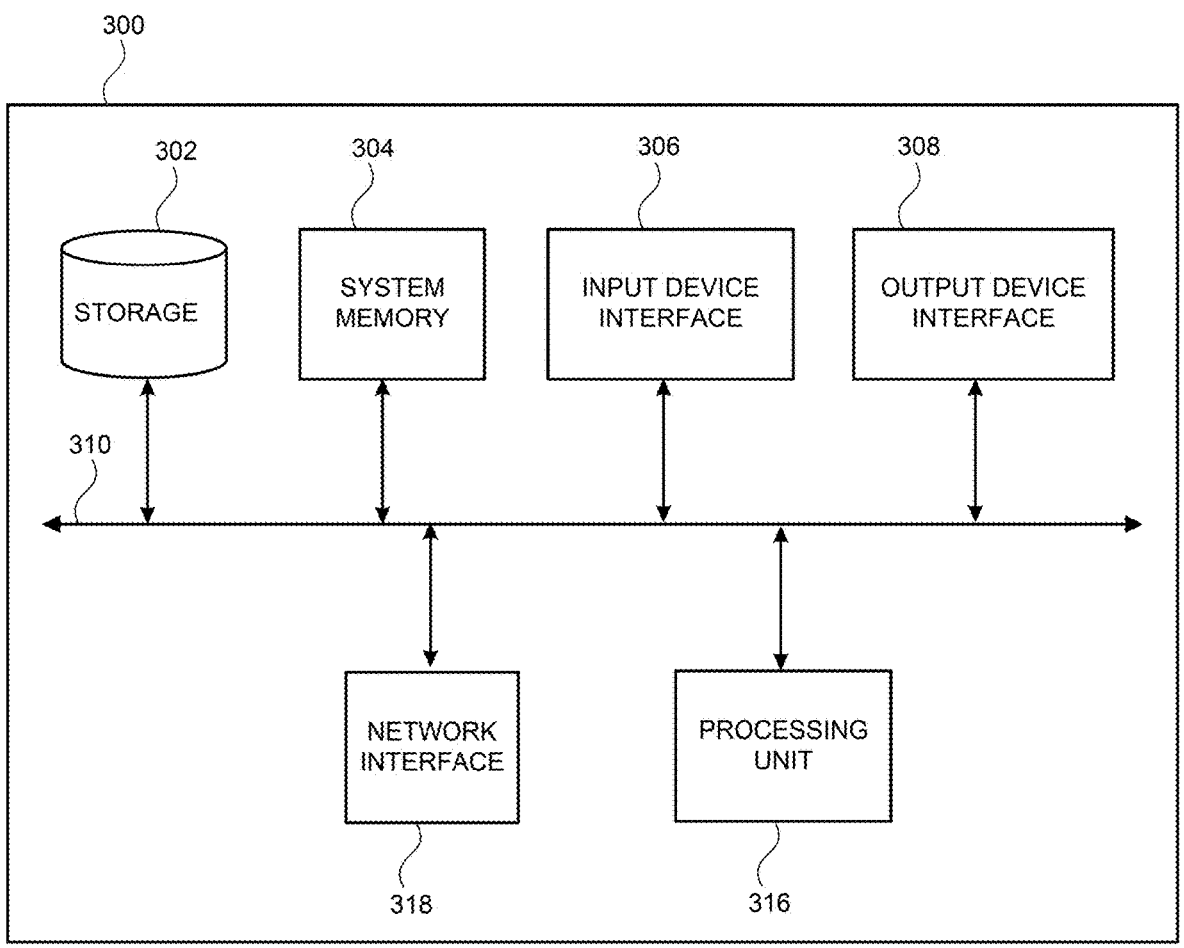
FIG. 3 illustrates an electronic system with which one or more implementations of the subject technology may be implemented.

FIG. 3 illustrates a system 300 with which one or more implementations of the subject technology may be implemented. The system 300 can be, and/or can be a part of, the server 106, as shown in FIG. 1. The system 300 may include various types of computer-readable media and interfaces for various other types of computer-readable media. The system 300 includes a bus 310, a processing unit 316, an input device interface 306, an output device interface 308, a network interface 318, a system memory 304 (and/or buffer), a storage device 302, or subsets and variations thereof.

The bus 310 collectively represents all system, peripheral, and chipset buses that communicatively connect the numerous internal devices of the system 300. In one or more implementations, the bus 310 communicatively connects the processing unit 316 with the other components of the system 300. From various memory units, the processing unit 316 retrieves instructions to execute and data to process in order to execute the operations of the subject disclosure. The processing unit 316 can be a controller and/or a single- or multi-core processor or processors in various implementations.

The bus 310 also connects to the input device interface 306 and output device interface 308. The input device interface 306 enables the system to receive inputs. For example, the input device interface 306 allows a user to communicate information (e.g., audio and/or video files) and select commands (e.g., whether to transmux) on the system 300. The input device interface 306 may be used with input devices such as keyboards, mice, and other user input devices as well as microphones, cameras, and other sensor devices. The output device interface 308 may enable, for example, the display of images generated by system 300. Output devices that may be used with the output device interface 308 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

The bus 310 also couples the system 300 to one or more networks and/or to one or more network nodes through the network interface 318. The network interface 318 may include one or more interfaces that allow the system 300 to be a part of a network of computers (such as a local area network (LAN), a wide area network ("WAN"), or a network of networks (the "Internet")). Any or all components of the system 300 can be used in conjunction with the subject disclosure.

The storage device 302 may be a read-and-write memory device. The storage device 302 may be a non-volatile memory unit that stores instructions and data (e.g., static and dynamic instructions and data) even when the system 300 is off. In one or more implementations, a mass-storage device (such as a magnetic or optical disk and its corresponding disk drive) may be used as the storage device 302. In one or more implementations, a removable storage device (such as a floppy disk, flash drive, and its corresponding disk drive) may be used as the storage device 302.

Like the storage device 302, the system memory 304 may be a read-and-write memory device. However, unlike the storage device 302, the system memory 304 may be a computer-readable medium, including volatile read-and-write memory (e.g., random access memory). The system memory 304 may store any of the computer-readable instructions and data that one or more processing unit 316 may need at runtime to perform operations. In one or more implementations, the processes of the subject disclosure are stored in the system memory 304 and/or the storage device 302. From these various memory units, the one or more processing unit 316 retrieves instructions to execute and data to process in order to execute the processes of one or more implementations.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory (e.g., the system memory 304), such as RAM, DRAM, SRAM, T-RAM, Z-RAM, and TTRAM. The computer-readable medium also can include any non-volatile semiconductor memory (e.g., the storage device 302), such as ROM, PROM, EPROM, EEPROM, NVRAM, flash, nvSRAM, FeRAM, FcTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Figure 4:
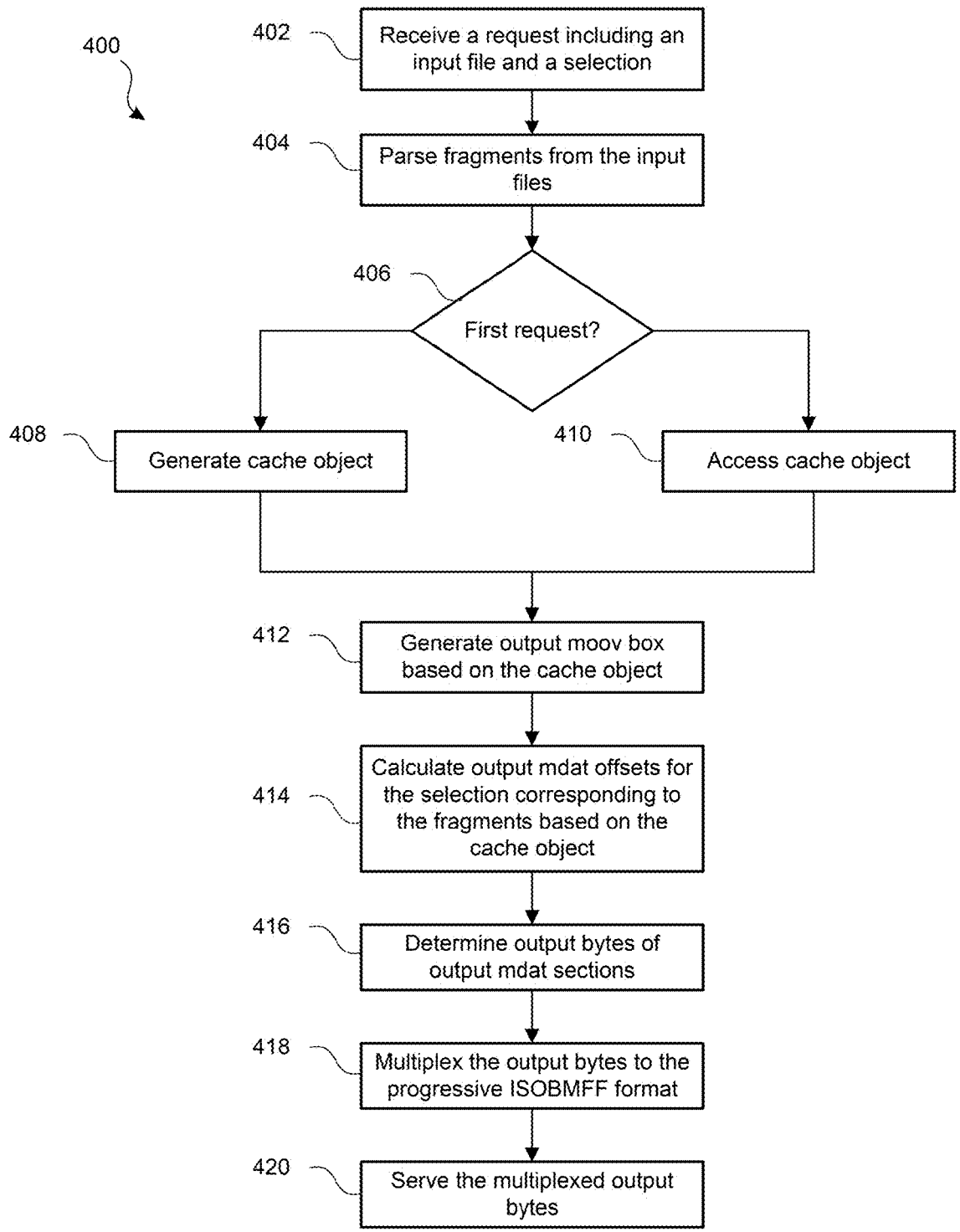
FIG. 4 illustrates a flow diagram of transmultiplexing and serving a progressive ISOBMFF file to a user, in accordance with one or more implementations.

Referring to FIG. 4, a flow diagram of a process 400 for transmultiplexing and serving a progressive ISOBMFF file to a user is illustrated, in accordance with one or more implementations. For explanatory purposes, the process 400 is primarily described herein with reference to FIG. 1, FIG. 2, and FIG. 3. The process 400 may be performed by, but is not limited to, the server 106. One or more blocks (or operations) of the process 400 may be performed by one or more other components of other suitable devices. Further, for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, a system (e.g., system 300) may receive a request including an input file and a selection. The input file may be in the fragmented ISOBMFF format and may be one or more files, such as a video file and an audio file. The request may include the input file(s) and/or instructions for accessing the requested input file(s). For example, the request may include web addresses for a video file and an audio file, such as "example.com/video.mp4" and "example.com/audio.mp4", respectively. As another example, the request may be a single web address, including the location of both a video and an audio file, such as: "service.example.com/progress?video=example.com/video.mp4&audio=example.com/audio.mp4"

The request may specify a selection of the portions of the input file(s) that the user wishes to receive as a progressive ISOBMFF file. For example, the video file may be 121841179 bytes and the audio file may be 39890763 bytes, respectively. The selection may be a range of the input file(s). For example, the request may include a selection of bytes 30000-400000. The output returned to the user (e.g., a browser, content delivery network (CDN), etc.) in response to the request would appear as bytes 30000-400000 of a progressive ISOBMFF file of a known size, allowing the user to play the output as if it were a normal progressive ISOBMFF file.

At block 404, the system may parse the fragments from the input file(s). As discussed above, fragmented ISOBMFF files are structured such that there are multiple fragments, such as moof and mdat boxes. However, parsing is not limited to moof and mdat boxes but may include other boxes and/or sub-boxes, such as moov boxes and its corresponding sub-boxes (e.g., stts box, trun box, ctts box, stsz box, tfhd box, and/or the like. The parsing may occur in parallel when there are multiple input files. For example, the fragments from a video file and an audio file may occur at the same time by different threads of the processor.

In one or more embodiments, parsing the fragments from the input file may include parsing an input moov box from the input file. For example, a moov box may be parsed from a video file and another moov box may be parsed from an audio file. The moov box is referred to herein as an input moov box if it is associated with an input file. Parsing the fragments from the input file may also comprise parsing an input sidx box from the input file. The sidx box is referred to herein as an input sidx box if it is associated with an input file. Parsing the fragments from the input file may further comprise parsing one or more input moof boxes from the input file, where an input moof box represents a beginning of a fragment (e.g., moof box followed by an mdat box). The moof box is referred to herein as an input moof box if it is associated with an input file.

In one or more embodiments, parsing the set of input moof boxes includes parsing input fragment sizes from the input sidx box. For example, an input sidx box from the audio file may have fragment sizes associated with the audio file and an input sidx box from the video file may have fragment sizes associated with the video file. Parsing the set of input moof boxes may also include deriving the set of input moof boxes from the input fragment sizes.

At block 406, the system may determine whether the request is the first request for a particular input file(s). If the request is not the first request, the process 400 accesses (e.g., retrieves, queries, downloads, etc.) a cache object associate with the particular input file(s) from memory (e.g., system memory 304) at block 410 because a cache object may have already been created for a similar request. This way, the subsequent requests do not need to redo input file parsing. If the request is the first request, the process 400 proceeds to block 408 to generate a cache object based on the fragments, as discussed in more detail with respect to FIG. 5.

At block 412, a moov box may be generated for an output file ("output moov box"). The moov box may be a progressive-style moov box as the output of the process 400 is a progressive ISOBMFF file. Progressive-style moov boxes can be generated from the input files' fragmented-style moov boxes and/or moof boxes because they contain the sample sizes, timestamps, and the like allowing the progressive-style moov to be reassembled. In one or more embodiments, the moov box may be accessed from the cache object, which may be stored in the cache object as a moov header.

At block 414, output mdat offsets for the selection (e.g., a range) corresponding to the fragments may be calculated by the system. The sidx box(es) of the input file(s) include fragment sizes that may be used to derive the offsets of the beginning (e.g., moof box) of each fragment, which may also be used to generate the output mdat offsets corresponding to each fragment (e.g., the mdat box that follows the moof box). For example, if a file starts at byte 0, a moof box is 5 bytes, and a fragment size is 10 bytes, the input data offset for the fifth mdat box would be at byte 60 ((10 bytes*4 fragments)+ (5 bytes*4 moof boxes)). In one or more embodiments, the calculation of the output mdat offsets may be based on the cache object. The cache object may include at least some of the information parsed from the input files at block 404, such as the ftyp box, moov box, and sidx box of at least one input file(s).

At block 416, output bytes of the output mdat section may be determined. The output mdat section may be a single section because the output is a progressive ISOBMFF file. The output mdat section may be based on the output mdat offsets. For example, if the start of an mdat box is byte 45 of an input file and the mdat box is 5 bytes, the output mdat section may be bytes 45 to byte 50. The output bytes may be a list (e.g., a table, array, or other organization structure) that contains the addresses of the output bytes. The output bytes may also or instead be copied to the output mdat section. The bytes that comprise the output mdat section may be the output bytes.

At block 418, the output bytes may be multiplexed into a progressive ISOBMFF file format. Once a cache object is available (e.g., generated or accessed), multiplexing of a requested selection (e.g., byte range) may occur. The details of the multiplexing is discussed in further detail with regard to FIG. 6.

At block 420, the multiplexed output bytes may be served. The multiplexed output bytes may be in a progressive ISOBMFF file format, while the fragmented ISOBMFF file format remains stored (e.g., on the server 106). The multiplexed output bytes may be served to the requester (e.g., the user computer 102). The multiplexed output bytes may be transmitted, copied, transferred, or otherwise sent to another device and/or stored on the device running the process 400.

Figure 5:
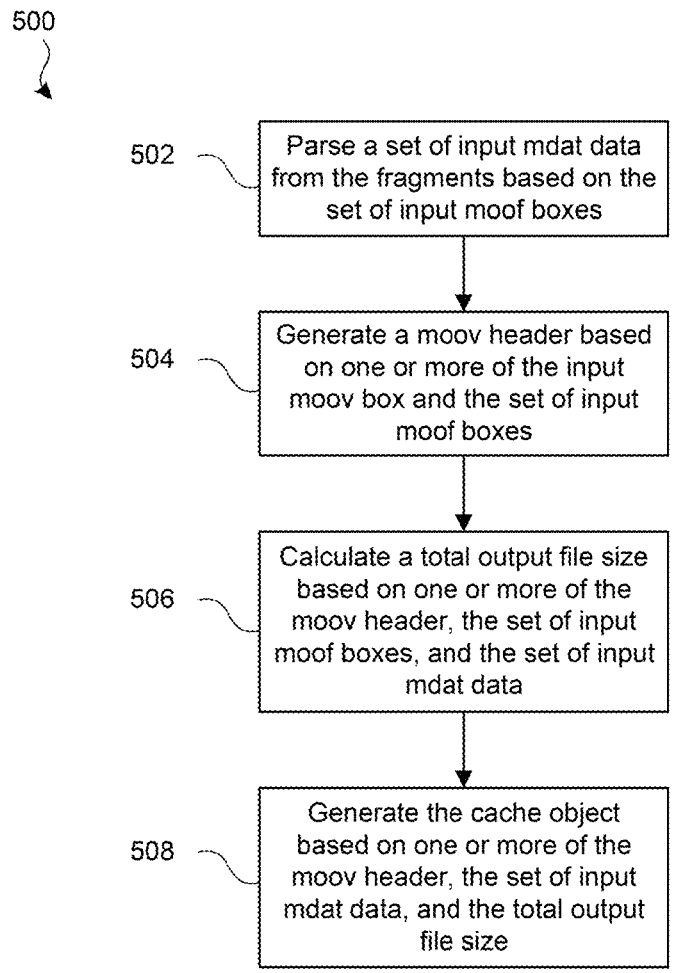
FIG. 5 illustrates a flow diagram of generating a cache object, in accordance with one or more implementations.

FIG. 5 illustrates a flow diagram of an example process 500 for generating a cache object as indicated in block 408. For explanatory purposes, the process 500 is primarily described herein with reference to FIG. 1, FIG. 2, FIG. 3, and FIG. 4. However, the process 500 is not limited to the server 106, and one or more blocks (or operations) of the process 500 may be performed by one or more other components of other suitable devices. Further, for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations. Although the process 500 may be discussed with respect to a single input file (e.g., a video file), the process 500 may occur in parallel or in serial with a second input file (e.g., an audio file).

At block 502, a set of input mdat data may be parsed from the fragments. After the sidx box is parsed from the input file(s), the fragment sizes contained within the sidx box may be used to derive the offsets of the beginning (e.g., the moof box) of each fragment. The moof boxes of the input file (the "input moof boxes") correspond to and precede an mdat box (also referred to as "input mdat data" or "mdat data"), in a fragmented ISOBMFF file such as the input file. The mdat offset data may be added to the cache object.

In one or more implementations, parsing the set of input mdat data may include opening a pool (e.g., one or more) of concurrent HTTP connections and reading and parsing the input moof boxes in parallel. The number of input moof boxes that can be read and parsed at a time may correspond to the number of opened current HTTP connections. The data that is read and parsed may be added to the cache object.

At block 504, an output moov header may be generated based on one or more of the input moov box and the set of input moof boxes. The output moov header may be a progressive-style moov box that can be directly generated from the fragmented-style moov boxes and moof boxes of the input file(s). The output moov header may comprise the following sub-boxes: an mvhd box, stts box, ctts box, stss box, stsz box, stco/co64 box, and/or the like. A brief description of several of the sub-boxes that may be used to generate the output moov box are included in the following paragraphs.

The mvhd box may define the timescale and/or duration information for the entire input file, as well as its playback characteristics. To generate the output moov box, the mvhd box of the output moov box may be set to the maximum of the input file duration (e.g., audio duration and/or video duration).

The stts box may include decoding times of each sample in a track of an input file. If the default duration is present in an input file's tfhd box, the default duration is used; otherwise, the default duration in the input file's trex box is used. If neither default durations are present, the stts box may be set to zero. Additionally or alternatively, if present sample entries are present in the input file's trun boxes (e.g., parsed as part of moof parsing), the moofs may be iterated and the stts box's entries may be populated with the entries from all of the file's trun boxes.

The ctts box may include presentation times of each sample in a truck of an input file. If a sample_composition_time_offsets_presents flag is set in the input file's trun boxes, a ctts box may be written. Entries of the ctts box are populated by iterating over the input file's moof boxes and using the sample_composition_time_offset variable in the sample entries in their trun boxes.

The stss box may include a table of sample numbers, where each entry in the table identifies a sample that is a key frame (e.g., a random access point (RAP)) for the media. The stss entries may be populated by iterating over the input file's moof boxes and using the sample_is_non_sync_sample variable in the sample entries in their trun boxes.

The stsz box may include a sample count and a table giving the size of each sample. The sample count is derived by counting the number of total samples present in the input file's trun boxes. If the input file's tfhd box has a default_sample_size set, that value is appended sample_count times to the entries array. Otherwise, if the input file's trex box has a default_sample_size set, that value is used sample_count times. If neither is set, the sample sizes are read directly from the input file's trun boxes and used.

The stco/co64 box may identify the location of each chunk of data in the file's data stream. The stco box may include a chunk offset table that gives the index of each chunk in the input file. The offsets are file offsets and not the offset into any box within the file (e.g., an mdat box). At first, all zeros are written to the chunk entries. Once the moov has been written, the stco box is rewritten in memory using a well-defined deterministic interleaving algorithm (e.g., the algorithm used during multiplexing).

In one or more embodiments, an ftyp box may also be generated based on the ftyp box of the input file(s). For example, the ftyp box of the cache object may be the same as the input file, and thus may be copied from the input file.

At block 506, the total output file size of the cache object may be calculated. The total output file size may be based on the output moov header, the set of input moof boxes, and/or the set of input mdat data. The moov size may be derived from the output moov header. For example, the size of the output moov header may be derived by writing the new progressive-style moov in-memory, based on the input moov and moofs, and noting its length. The mdat size (the box that contains all of the input file samples) may be calculated by summing the sample sizes parsed from the moof boxes of the input file (because the moof boxes contain the metadata of their respective mdat boxes) and adding the mdat box header size (e.g., a fixed size). The total output file size may then be the sum of the moov size and the mdat size. In one or more embodiments, the total output file size may be used in the HTTP response header.

At block 508, generating the cache object based on one or more of the output moov header, the set of input mdat data, and the total output file size. The input file(s) may have their ftyp and moov boxes parsed (e.g., block 504) and the information contained within added to the cache object. The moof boxes may also be read and parsed (e.g., at block 502) and their data added to the cache object. For example, the mdat data corresponding to the moof boxes may be added to the mdat box of the cache object. The total output file size (e.g., at block 506) may also be added to the cache object.

Figure 6:
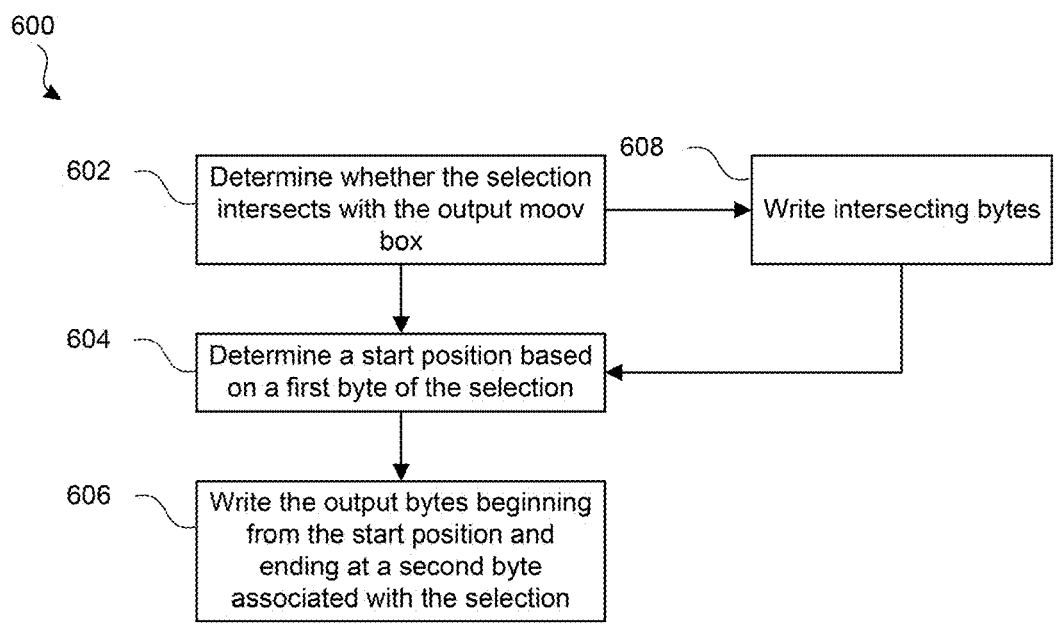
FIG. 6 illustrates a flow diagram of multiplexing the output bytes to a progressive ISOBMFF format, in accordance with one or more implementations.

FIG. 6 illustrates a flow diagram of a process 600 for multiplexing the output bytes to a progressive ISOBMFF format, in accordance with one or more implementations. For explanatory purposes, the process 600 is primarily described herein with reference to FIG. 1, FIG. 2, FIG. 3, FIG. 4, and FIG. 5. However, the process 600 is not limited to the server 106, and one or more blocks (or operations) of the process 600 may be performed by one or more other components of other suitable devices. Further, for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations. Although the process 600 may be discussed with respect to a single input file (e.g., a video file), the process 600 may occur in parallel or in serial with a second input file (e.g., an audio file).

At block 602, the system (e.g., the server 106) may determine whether the selection (e.g., a byte range of the output file(s) requested by a user computer 102) intersects with the output moov box, the output ftyp box, and/or an ISOBMFF box header of the output mdat box. Intersecting may include overlapping with part of a byte range of a particular box. For example, assuming the output moov box is located at bytes 5-10 of the cache object, the selection would intersect with the output moov box if the selection is bytes 8-15 because bytes 8-10 of the selection overlap with the output moov box. If there is no intersection, the process 600 proceeds to block 604; otherwise, the process proceeds to block 608.

At block 604, the system may determine a start position for writing the output bytes. The start position may be based on the first byte of the selection (e.g., the selection may be a range from x to y, where x is the first byte). In one or more embodiments, the determination may begin by opening a reusable HTTP connection per input file with a prefetch (e.g., how many bytes it will read on each seek or refill of its internal buffer) that matches the size of how many source ISOBMFF segments that will need to be fetched during demultiplexing, which can be directly calculated by summing the reference_size fields from any fragment that will be read.

The start position may be determined by running a well-defined deterministic interleaving algorithm in order from the start of the cache object, in a dry run style, until the final offset (e.g., an offset from the start of the cache object that takes into account the moov, ftyp, etc. sizes) is greater than the first byte of the requested selection. An example well-defined deterministic interleaving algorithm would interleave audio and video samples as follows:

--- Start of Samples ---
13 Video Samples
24 Audio Samples
13 Video Samples
24 Audio Samples
.
.
.
13 Video Samples
24 Audio Samples
F Video Samples
G Audio Samples
--- End of Samples ---

F and G are the leftover samples at the end of the file (e.g., F would be less than or equal to 13 and G would be less than or equal to 24). The algorithm is deterministic because the state (e.g., size of total samples written so far, sample currently being written, etc.) is reproducible and the algorithm and state are known in order to know where the algorithm is inside the mdat box and/or input files for any given selection request (e.g., range request). It should be understood that if the input file (e.g., MP4 file) is only a video track (or file), then only those steps involving the video track (or file) need to be performed.

At block 606, the system may write the output bytes beginning from the start position and ending at the second byte of the selection. For example, if the selection is a range such as byte 5 to byte 50, the system may write the output bytes starting at byte 5 and ending at byte 50. If, for example, the selection is a single byte, the first and second byte of the selection may be the same. In one or more embodiments, if the selection is a single byte, the system may write the output bytes from the beginning of the cache object, mdat box, or any other predetermined box up to the selection. In one or more embodiments, if the selection is a single byte, the system may write the output bytes from the selection to the end of the cache object, mdat box, or any other predetermined box.

At block 608, if it is determined at block 602 that the selection intersects with the output moov box, the output ftyp box, and/or the ISOBMFF box header of the output mdat box, the system writes the intersecting bytes directly to the output bytes. The system may also adjust the requested selection to be satisfied by the mdat box multiplexing (e.g., at block 606) to reflect the bytes already served (e.g., the intersecting bytes), after which the process 600 may proceed to block 604 to write the adjust selection of output bytes.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine (e.g., her) and vice versa. Headings and subheadings, if any, are used for convenience only and do not limit the subject disclosure.

What is claimed is:

1. A method for converting a fragmented ISOBMFF format to a progressive ISOBMFF format, comprising:
    receiving a request including an input file and a selection, wherein the input file is in the fragmented ISOBMFF format including an input multitude of video data fragments and a separate mdat box for each of the input multitude of video data fragments;
    parsing the input multitude of video data fragments from the input file;
    generating an output moov box and an output mdat box for an output file in the progressive ISOBMFF format including an output multitude of video data fragments and a single mdat box for the entire output multitude of video data fragments, based on the parsing of the input multitude of video data fragments;
    calculating output mdat offsets for a range request pertaining to the selection;
    determining output bytes of an output mdat section, wherein the output mdat section is based on the output mdat offsets;
    multiplexing the output bytes to the progressive ISOBMFF format; and
    serving the multiplexed output bytes.

2. The method of claim 1, wherein the parsing of the input multitude of video data fragments from the input file is performed in parallel.

3. The method of claim 1, wherein the parsing of the input multitude of video data fragments of the input file comprises:
    parsing an input moov box from the input file;
    parsing an input sidx box from the input file; and
    parsing a set of input moof boxes based on the input sidx box, wherein an input moof box of the set of input moof boxes represents a beginning of a fragment.

4. The method of claim 3, wherein the parsing of the set of input moof boxes comprises:
    parsing input video data fragment sizes from the input sidx box; and
    deriving the set of input moof boxes from the input video data fragment sizes.

5. The method of claim 1, wherein the multiplexing of the output bytes to the progressive ISOBMFF format comprises:
    determining whether the selection intersects with the output moov box;
    determining, with an interleaving algorithm and based on a first byte of the selection, a start position, in response to determining that the selection does not intersect with the output moov box; and
    writing, into the progressive ISOBMFF format, the output bytes beginning from the start position and ending at a second byte associated with the selection.

6. The method of claim 5, wherein the determining of the start position comprises traversing the input file from a beginning of the input file until the first byte of the selection.

7. The method of claim 1, further comprising caching the output moov box, the output mdat box and the output multitude of video fragments in a cache object following the generating step.

8. A method for converting a fragmented ISOBMFF format to a progressive ISOBMFF format, comprising:

receiving a request including an input file and a selection, wherein the input file is in the fragmented ISOBMFF format;
parsing one or more fragments from the input file;
generating a cache object based on the fragments;
generating an output moov box based on at least one of the fragments or the cache object;
calculating output mdat offsets for the selection corresponding to the fragments based on at least one of the fragments or the cache object;
determining output bytes of an output mdat section, wherein the output mdat section is based on the output mdat offsets;
multiplexing the output bytes to the progressive ISOBMFF format; and
serving the multiplexed output bytes;
wherein the parsing of the fragments of the input file comprises:
parsing an input moov box from the input file;
parsing an input sidx box from the input file; and
parsing a set of input moof boxes based on the input sidx box, wherein an input moof box of the set of input moof boxes represents a beginning of a fragment; and
wherein the generating of the cache object comprises:
parsing a set of input mdat data from the one or more fragments based on the set of input moof boxes;
generating an output moov header based on one or more of the input moov box and the set of input moof boxes;
calculating a total output file size based on one or more of the output moov header, the set of input moof boxes, and an mdat header size; and
generating the cache object based on one or more of the output moov header, the set of input mdat data, and the total output file size.

9. The method of claim 8, wherein the parsing of the set of input mdat data comprises:
opening a pool of concurrent HTTP connections; and
parsing, with the pool of concurrent HTTP connections, the set of input mdat data from the one or more fragments based on the input set of moof boxes.

10. The method of claim 9, wherein the number of input moof boxes of the set of input moof boxes that are parsed in parallel correspond to a number of concurrent HTTP connections in the pool of concurrent HTTP connections.

11. The method of claim 8, wherein the calculating of the total output file size comprises:
determining an output moov size of the output moov header;
parsing a set of input mdat sizes from the set of input moof boxes; and
calculating the total output file size based on a sum of the output moov size and the set of input mdat sizes.

12. A system for converting a fragmented ISOBMFF format to a progressive ISOBMFF format, comprising:
a controller configured to execute computer-readable instructions that cause the controller to perform operations comprising:
receiving a request including an input file and a selection, wherein the input file is in the fragmented ISOBMFF format including an input multitude of video data fragments and a separate mdat box for each of the input multitude of video data fragments;
parsing the input multiple of video data fragments from the input file;
generating an output moov box and an output mdat box for an output file in the progressive ISOBMFF format including an output multitude of video data fragments and a single mdat box for the entire output multiple of video data fragments, based on the parsing of the input multitude of video data fragments;
calculating output mdat offsets for a range request pertaining to the selection;
determining output bytes of an output mdat section, wherein the output mdat section is based on the output mdat offsets;
multiplexing the output bytes to the progressive ISOBMFF format; and
serving the multiplexed output bytes.

13. The system of claim 12, wherein the parsing of the input multitude of video data fragments of the input file comprises:
parsing an input moov box from the input file;
parsing an input sidx box from the input file; and
parsing a set of input moof boxes based on the input sidx box, wherein an input moof box of the set of input moof boxes represents a beginning of a fragment.

14. The system of claim 13, wherein the parsing of the set of input moof boxes comprises:
parsing input video data fragment sizes from the input sidx box; and
deriving the set of input moof boxes from the input video data fragment sizes.

15. The system of claim 12, wherein the multiplexing of the output bytes to the progressive ISOBMFF format comprises:
determining whether the selection intersects with the output moov box;
determining, with an interleaving algorithm and based on a first byte of the selection, a start position, in response to determining that the selection does not intersect with the output moov box; and
writing, into the progressive ISOBMFF format, the output bytes beginning from the start position and ending at a second byte associated with the selection.

16. The system of claim 12, wherein the computer-readable instructions cause the controller to further perform a step of caching the output moov box, the output mdat box and the output multitude of video fragments in a cache object following the generating step.

17. A system for converting a fragmented ISOBMFF format to a progressive ISOBMFF format, comprising:
a controller configured to execute computer-readable instructions that cause the controller to perform operations comprising:
receiving a request including an input file and a selection, wherein the input file is in the fragmented ISOBMFF format;
parsing one or more fragments from the input file;
generating a cache object based on the fragments;
generating an output moov box based on at least one of the fragments or the cache object;
calculating output mdat offsets for the selection corresponding to the fragments based on at least one of the fragments or the cache object;
determining output bytes of an output mdat section, wherein the output mdat section is based on the output mdat offsets;
multiplexing the output bytes to the progressive ISOBMFF format;

and serving the multiplexed output bytes;
wherein the parsing of the fragments of the input file comprises:
parsing an input moov box from the input file;
parsing an input sidx box from the input file; and
parsing a set of input moof boxes based on the input sidx box, wherein an input moof box of the set of input moof boxes represents a beginning of a fragment; and
wherein the generating of the cache object comprises:
parsing a set of input mdat data from the one or more fragments based on the set of input moof boxes;
generating an output moov header based on one or more of the input moov box and the set of input moof boxes;
calculating a total output file size based on one or more of the output moov header, the set of input moof boxes, and an mdat header size; and
generating the cache object based on one or more of the output moov header, the set of input mdat data, and the total output file size.

18. The system of claim 17, wherein the calculating of the total output file size comprises:
determining an output moov size of the output moov header;
parsing a set of input mdat sizes from the set of input moof boxes; and
calculating the total output file size based on a sum of the moov size and the set of input mdat sizes.

19. A non-transitory computer-readable medium storing instructions for converting a fragmented ISOBMFF format to a progressive ISOBMFF format that, when executed by a processor, cause the processor to perform operations comprising:
receiving a request including an input file and a selection, wherein the input file is in the fragmented ISOBMFF format including an input multitude of video data fragments and a separate mdat box for each of the input multitude of video data fragments;
parsing the input multitude of video data fragments from the input file;
generating an output moov box and an output mdat box for an output file in the progressive ISOBMGG format including an output multitude of video data fragments and a single mdat box for the entire output multitude of video data fragments, based on the parsing the input multitude of video data fragments;
calculating output mdat offsets for a range request pertaining to the selection;
determining output bytes of an output mdat section, wherein the output mdat section is based on the output mdat offsets;
multiplexing the output bytes to the progressive ISOBMFF format; and
serving the multiplexed output bytes.

20. The non-transitory computer-readable medium of claim 19, wherein the parsing of the input multitude of video data fragments of the input file comprises:
parsing an input moov box from the input file;
parsing an input sidx box from the input file; and
parsing a set of input moof boxes based on the input sidx box, wherein an input moof box of the set of input moof boxes represents a beginning of a fragment.

21. The non-transitory computer-readable medium of claim 19, wherein the multiplexing of the output bytes to the progressive ISOBMFF format comprises:
determining whether the selection intersects with the output moov box;
determining, with an interleaving algorithm and based on a first byte of the selection, a start position, in response to determining that the selection does not intersect with the output moov box; and
writing, into the progressive ISOBMFF format, the output bytes beginning from the start position and ending at a second byte associated with the selection.

22. The non-transitory computer-readable medium of claim 19, wherein the instructions further cause the processor to perform an operation of caching the output moov box, the output mdat box and the output multitude of video fragments in a cache object following the generating step.

23. A non-transitory computer-readable medium storing instructions for converting a fragmented ISOBMFF format to a progressive ISOBMFF format that, when executed by a processor, cause the processor to perform operations comprising:
receiving a request including an input file and a selection, wherein the input file is in the fragmented ISOBMFF format;
parsing one or more fragments from the input file;
generating a cache object based on the fragments;
generating an output moov box based on at least one of the fragments or the cache object;
calculating output mdat offsets for the selection corresponding to the fragments based on at least one of the fragments or the cache object;
determining output bytes of an output mdat section, wherein the output mdat section is based on the output mdat offsets;
multiplexing the output bytes to the progressive ISOBMFF format; and
serving the multiplexed output bytes;
wherein the parsing of the fragments of the input file comprises:
parsing an input moov box from the input file;
parsing an input sidx box from the input file; and
parsing a set of input moof boxes based on the input sidx box, wherein an input moof box of the set of input moof boxes represents a beginning of a fragment; and
wherein the generating of the cache object comprises:
parsing a set of input mdat data from the one or more fragments based on the set of input moof boxes;
generating an output moov header based on one or more of the input moov box and the set of input moof boxes;
calculating a total output file size based on one or more of the output moov header, the set of input moof boxes, and an mdat header size; and
generating the cache object based on one or more of the output moov header, the set of input mdat data, and the total output file size.

24. A method for converting a fragmented ISOBMFF format to a progressive ISOBMFF format, comprising:
providing an input file in a fragmented ISOBMFF format including an input moov box, and input sidx box and an input multitude of video moof boxes and a separate mdat box for each of the input multitude of video moof boxes;
parsing the entire input file in the fragmented ISOBMFF format including,
reading and parsing the input moov box,
reading and parsing the input sidx box, and reading and parsing the input multitude of video moof boxes;
calculating one or more of a single output moov box, a single output mdat box, and a file size for an output file in a progressive ISOBMFF including the single output moov box and the single output mdat box; and
storing one or more of the single output moov box, the single output mdat box and the file size in a cache;
using the cache to satisfy one or more progressive ISOBMFF range requests.

* * * * *